(12) United States Patent  
Komatsu

(10) Patent No.: US 7,999,980 B2
(45) Date of Patent: Aug. 16, 2011

(54) IMAGE PROCESSING APPARATUS AND IMAGE PROCESSING METHOD FOR BINARY AND MULTIVALUE HALFTONING

(75) Inventor: Yasuo Komatsu, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/801,480

(22) Filed: Jun. 10, 2010

(65) Prior Publication Data

US 2010/0253980 A1 Oct. 7, 2010

Related U.S. Application Data

(63) Continuation of application No. 11/251,207, filed on Oct. 17, 2005, now abandoned.

(30) Foreign Application Priority Data

Mar. 29, 2005 (JP) ................................. 2005-093910

(51) Int. Cl.
*H04N 1/46* (2006.01)
(52) U.S. Cl. ....... 358/536; 358/1.9; 358/3.01; 358/3.06; 358/3.2; 358/3.23; 382/274; 399/181
(58) Field of Classification Search .................. 358/536, 358/1.9, 3.01, 3.03, 3.06, 3.23, 3.2; 382/274; 399/32, 181
See application file for complete search history.

(56) References Cited

U.S. PATENT DOCUMENTS 5,291,311 A * 3/1994 Miller ........................... 358/3.23
6,178,011 B1 1/2001 Lin et al.
6,304,340 B1 * 10/2001 Wang ............................. 358/1.9
6,707,577 B1 * 3/2004 Morikawa et al. ........... 358/3.03
6,763,144 B1 7/2004 Gershony
2003/0189728 A1 * 10/2003 Jung ............................ 358/3.06
2004/0051907 A1 3/2004 Huang et al.

(Continued)

FOREIGN PATENT DOCUMENTS

JP A-07-254985 10/1995

(Continued)

OTHER PUBLICATIONS

Sep. 10, 2008 Office Action issued in U.S. Appl. No. 11/251,207.

(Continued)

*Primary Examiner* — Chan S Park
*Assistant Examiner* — David S. Cammack
(74) *Attorney, Agent, or Firm* — Oliff & Berridge, PLC

(57) ABSTRACT

An image processing apparatus for converting a multiple gradation image into a binary or multivalue image by use of an area gradation method according to a screen cell is provided. The apparatus includes a receiving unit that receives an input pixel value of each pixel of the multiple gradation image and position information on the screen cell, an output unit that has a lookup table storing an output pixel value corresponding to the input pixel value in such a manner that an image is formed in which the output pixel value is increased or decreased with an increase in the input pixel value, and a screen line number is kept at a prescribed level with the increase in the input pixel value but a dot position is different, and that outputs the output pixel value at a pixel position on the screen cell corresponding to the position information by referring to the lookup table, according to the input pixel value and the position information received by the receiving unit.

8 Claims, 13 Drawing Sheets

U.S. PATENT DOCUMENTS

2006/0012829 A1* 1/2006 Herron .................... 358/3.06

FOREIGN PATENT DOCUMENTS

| JP | A-07-254986 | 10/1995 |
|---|---|---|
| JP | A-07-283941 | 10/1995 |
| JP | A-08-114965 | 5/1996 |
| JP | A-08-125863 | 5/1996 |
| JP | A-08-156329 | 6/1996 |
| JP | A-11-331562 | 11/1999 |
| JP | A-11-331584 | 11/1999 |
| JP | A-2000-071439 | 3/2000 |
| JP | A-2000-307861 | 11/2000 |

OTHER PUBLICATIONS

Dec. 22, 2008 Office Action issued in U.S. Appl. No. 11/251,207.
Jun. 8, 2009 Office Action issued in U.S. Appl. No. 11/251,207.
Oct. 7, 2009 Office Action issued in U.S. Appl. No. 11/251,207.
Mar. 15, 2010 Office Action issued in U.S. Appl. No. 11/251,207.

* cited by examiner

LASER PULSE OUTPUT TIMING CHART

FIG.7A OUTPUT PIXEL VALUE : 0

FIG.7B OUTPUT PIXEL VALUE : 8

FIG.7C OUTPUT PIXEL VALUE : 16

FIG.7D OUTPUT PIXEL VALUE : 255

*123a* LOOKUP TABLE (INPUT VALUES 0 TO 129)

| INPUT VALUE | CELL NUMBER 1 | 2 | 10 | 16 | 36 | ... | INPUT VALUE | CELL NUMBER 1 | 2 | 10 | 16 | 36 | ... |
|---|---|---|---|---|---|---|---|---|---|---|---|---|---|
| 0 | 0 | 0 | 0 | 0 | 0 | ... | 65 | 255 | 0 | 8 | 0 | 0 | ... |
| 1 | 32 | 0 | 0 | 0 | 0 | ... | 66 | 255 | 0 | 16 | 0 | 0 | ... |
| 2 | 64 | 0 | 0 | 0 | 0 | ... | 67 | 255 | 0 | 24 | 0 | 0 | ... |
| 3 | 96 | 0 | 0 | 0 | 0 | ... | 68 | 255 | 0 | 32 | 0 | 0 | ... |
| 4 | 128 | 0 | 0 | 0 | 0 | ... | 69 | 255 | 0 | 40 | 0 | 0 | ... |
| 5 | 160 | 0 | 0 | 0 | 0 | ... | 70 | 255 | 0 | 48 | 0 | 0 | ... |
| 6 | 192 | 0 | 0 | 0 | 0 | ... | 71 | 255 | 0 | 56 | 0 | 0 | ... |
| 7 | 224 | 0 | 0 | 0 | 0 | ... | 72 | 255 | 0 | 64 | 0 | 0 | ... |
| 8 | 255 | 0 | 0 | 0 | 0 | ... | 73 | 255 | 0 | 72 | 0 | 0 | ... |
| 9 | 255 | 0 | 0 | 0 | 0 | ... | 74 | 255 | 0 | 80 | 0 | 0 | ... |
| 10 | 255 | 0 | 0 | 0 | 0 | ... | 75 | 255 | 0 | 88 | 0 | 0 | ... |
| 11 | 255 | 0 | 0 | 0 | 0 | ... | 76 | 255 | 0 | 96 | 0 | 0 | ... |
| 12 | 225 | 0 | 0 | 0 | 0 | ... | 77 | 225 | 0 | 104 | 0 | 0 | ... |
| 13 | 225 | 0 | 0 | 0 | 0 | ... | 78 | 225 | 0 | 112 | 0 | 0 | ... |
| 14 | 255 | 0 | 0 | 0 | 0 | ... | 79 | 255 | 0 | 120 | 0 | 0 | ... |
| 15 | 255 | 0 | 0 | 0 | 0 | ... | 80 | 255 | 0 | 128 | 0 | 0 | ... |
| 16 | 255 | 0 | 0 | 0 | 0 | ... | 81 | 255 | 0 | 136 | 0 | 0 | ... |
| 17 | 255 | 0 | 0 | 0 | 0 | ... | 82 | 255 | 0 | 144 | 0 | 0 | ... |
| 18 | 255 | 0 | 0 | 0 | 0 | ... | 83 | 255 | 0 | 152 | 0 | 0 | ... |
| 19 | 255 | 0 | 0 | 0 | 0 | ... | 84 | 255 | 0 | 160 | 0 | 0 | ... |
| 20 | 255 | 0 | 0 | 0 | 0 | ... | 85 | 255 | 0 | 168 | 0 | 0 | ... |
| 21 | 255 | 0 | 0 | 0 | 0 | ... | 86 | 255 | 0 | 176 | 0 | 0 | ... |
| 22 | 255 | 0 | 0 | 0 | 0 | ... | 87 | 255 | 0 | 184 | 0 | 0 | ... |
| 23 | 255 | 0 | 0 | 0 | 0 | ... | 88 | 255 | 0 | 192 | 0 | 0 | ... |
| 24 | 255 | 0 | 0 | 0 | 0 | ... | 89 | 255 | 0 | 200 | 0 | 0 | ... |
| 25 | 255 | 0 | 0 | 0 | 32 | ... | 90 | 255 | 0 | 208 | 0 | 0 | ... |
| 26 | 255 | 0 | 0 | 0 | 64 | ... | 91 | 255 | 0 | 216 | 0 | 0 | ... |
| 27 | 255 | 0 | 0 | 0 | 96 | ... | 92 | 255 | 0 | 224 | 0 | 0 | ... |
| 28 | 255 | 0 | 0 | 0 | 128 | ... | 93 | 255 | 0 | 232 | 0 | 0 | ... |
| 29 | 255 | 0 | 0 | 0 | 160 | ... | 94 | 255 | 0 | 240 | 0 | 0 | ... |
| 30 | 255 | 0 | 0 | 0 | 192 | ... | 95 | 255 | 0 | 248 | 0 | 0 | ... |
| 31 | 255 | 0 | 0 | 0 | 224 | ... | 96 | 255 | 0 | 255 | 0 | 0 | ... |
| 32 | 255 | 0 | 0 | 0 | 255 | ... | 97 | 255 | 0 | 255 | 0 | 8 | ... |
| 33 | 255 | 0 | 0 | 0 | 255 | ... | 98 | 255 | 0 | 255 | 0 | 16 | ... |
| 34 | 255 | 0 | 0 | 0 | 255 | ... | 99 | 255 | 0 | 255 | 0 | 24 | ... |
| 35 | 255 | 0 | 0 | 0 | 255 | ... | 100 | 255 | 0 | 255 | 0 | 32 | ... |
| 36 | 255 | 0 | 0 | 0 | 255 | ... | 101 | 255 | 0 | 255 | 0 | 40 | ... |
| 37 | 255 | 0 | 0 | 0 | 255 | ... | 102 | 255 | 0 | 255 | 0 | 48 | ... |
| 38 | 255 | 0 | 0 | 0 | 255 | ... | 103 | 255 | 0 | 255 | 0 | 56 | ... |
| 39 | 255 | 0 | 0 | 0 | 255 | ... | 104 | 255 | 0 | 255 | 0 | 64 | ... |
| 40 | 255 | 0 | 0 | 0 | 255 | ... | 105 | 255 | 0 | 255 | 0 | 72 | ... |
| 41 | 255 | 0 | 0 | 0 | 255 | ... | 106 | 255 | 0 | 255 | 0 | 80 | ... |
| 42 | 255 | 0 | 0 | 0 | 255 | ... | 107 | 255 | 0 | 255 | 0 | 88 | ... |
| 43 | 255 | 0 | 0 | 0 | 255 | ... | 108 | 255 | 0 | 255 | 0 | 96 | ... |
| 44 | 255 | 0 | 0 | 0 | 255 | ... | 109 | 255 | 0 | 255 | 0 | 104 | ... |
| 45 | 255 | 0 | 0 | 0 | 255 | ... | 110 | 255 | 0 | 255 | 0 | 112 | ... |
| 46 | 255 | 0 | 0 | 0 | 255 | ... | 111 | 255 | 0 | 255 | 0 | 120 | ... |
| 47 | 255 | 0 | 0 | 0 | 255 | ... | 112 | 255 | 0 | 255 | 0 | 128 | ... |
| 48 | 255 | 0 | 0 | 0 | 255 | ... | 113 | 255 | 0 | 255 | 0 | 136 | ... |
| 49 | 255 | 0 | 0 | 32 | 255 | ... | 114 | 255 | 0 | 255 | 0 | 144 | ... |
| 50 | 255 | 0 | 0 | 64 | 255 | ... | 115 | 255 | 0 | 255 | 0 | 152 | ... |
| 51 | 255 | 0 | 0 | 96 | 255 | ... | 116 | 255 | 0 | 255 | 0 | 160 | ... |
| 52 | 255 | 0 | 0 | 128 | 255 | ... | 117 | 255 | 0 | 255 | 0 | 168 | ... |
| 53 | 255 | 0 | 0 | 160 | 255 | ... | 118 | 255 | 0 | 255 | 0 | 176 | ... |
| 54 | 255 | 0 | 0 | 192 | 255 | ... | 119 | 255 | 0 | 255 | 0 | 184 | ... |
| 55 | 255 | 0 | 0 | 224 | 255 | ... | 120 | 255 | 0 | 255 | 0 | 192 | ... |
| 56 | 255 | 0 | 0 | 255 | 255 | ... | 121 | 255 | 0 | 255 | 0 | 200 | ... |
| 57 | 255 | 32 | 0 | 255 | 255 | ... | 122 | 255 | 0 | 255 | 0 | 208 | ... |
| 58 | 255 | 64 | 0 | 255 | 255 | ... | 123 | 255 | 0 | 255 | 0 | 216 | ... |
| 59 | 255 | 96 | 0 | 255 | 255 | ... | 124 | 255 | 0 | 255 | 0 | 224 | ... |
| 60 | 255 | 128 | 0 | 255 | 255 | ... | 125 | 255 | 0 | 255 | 0 | 232 | ... |
| 61 | 255 | 160 | 0 | 255 | 255 | ... | 126 | 255 | 0 | 255 | 0 | 240 | ... |
| 62 | 255 | 192 | 0 | 255 | 255 | ... | 127 | 255 | 0 | 255 | 0 | 248 | ... |
| 63 | 255 | 224 | 0 | 255 | 255 | ... | 128 | 255 | 0 | 255 | 0 | 255 | ... |
| 64 | 255 | 255 | 0 | 255 | 255 | ... | 129 | 255 | 0 | 255 | 0 | 255 | ... |

FIG.8

123b
LOOKUP TABLE
(INPUT VALUES 64 TO 96)

| INPUT VALUE \ CELL NUMBER | 2 | 7 | 14 | 15 | 22 | 23 | 27 | 30 | ... |
|---|---|---|---|---|---|---|---|---|---|
| ⋮ | ⋮ | ⋮ | ⋮ | ⋮ | ⋮ | ⋮ | ⋮ | ⋮ | |
| AD64 → 64 | 255 | 0 | 0 | 0 | 0 | 0 | 255 | 0 | ... |
| 65 | 255 | 32 | 0 | 0 | 0 | 0 | 224 | 32 | ... |
| 66 | 255 | 64 | 0 | 0 | 0 | 0 | 192 | 64 | ... |
| 67 | 255 | 96 | 0 | 0 | 0 | 0 | 160 | 96 | ... |
| AD68 → 68 | 255 | 128 | 0 | 0 | 0 | 0 | 128 | 128 | ... |
| 69 | 255 | 160 | 0 | 0 | 0 | 0 | 96 | 160 | ... |
| 70 | 255 | 192 | 0 | 0 | 0 | 0 | 64 | 192 | ... |
| 71 | 255 | 224 | 0 | 0 | 0 | 0 | 32 | 224 | ... |
| AD72 → 72 | 255 | 255 | 0 | 0 | 0 | 0 | 0 | 255 | ... |
| 73 | 224 | 255 | 0 | 32 | 32 | 0 | 0 | 255 | ... |
| 74 | 192 | 255 | 0 | 64 | 64 | 0 | 0 | 255 | ... |
| 75 | 160 | 255 | 0 | 96 | 96 | 0 | 0 | 255 | ... |
| AD76 → 76 | 128 | 255 | 0 | 128 | 128 | 0 | 0 | 255 | ... |
| 77 | 96 | 255 | 0 | 160 | 160 | 0 | 0 | 255 | ... |
| 78 | 64 | 255 | 0 | 192 | 192 | 0 | 0 | 255 | ... |
| 79 | 32 | 255 | 0 | 224 | 224 | 0 | 0 | 255 | ... |
| AD80 → 80 | 0 | 255 | 0 | 255 | 255 | 0 | 0 | 255 | ... |
| 81 | 0 | 255 | 32 | 255 | 255 | 0 | 0 | 255 | ... |
| 82 | 0 | 255 | 64 | 255 | 255 | 0 | 0 | 255 | ... |
| 83 | 0 | 255 | 96 | 255 | 255 | 0 | 0 | 255 | ... |
| 84 | 0 | 255 | 128 | 255 | 255 | 0 | 0 | 255 | ... |
| 85 | 0 | 255 | 160 | 255 | 255 | 0 | 0 | 255 | ... |
| 86 | 0 | 255 | 192 | 255 | 255 | 0 | 0 | 255 | ... |
| 87 | 0 | 255 | 224 | 255 | 255 | 0 | 0 | 255 | ... |
| 88 | 0 | 255 | 255 | 255 | 255 | 0 | 0 | 255 | ... |
| 89 | 0 | 255 | 255 | 255 | 255 | 32 | 0 | 255 | ... |
| 90 | 0 | 255 | 255 | 255 | 255 | 64 | 0 | 255 | ... |
| 91 | 0 | 255 | 255 | 255 | 255 | 96 | 0 | 255 | ... |
| 92 | 0 | 255 | 255 | 255 | 255 | 128 | 0 | 255 | ... |
| 93 | 0 | 255 | 255 | 255 | 255 | 160 | 0 | 255 | ... |
| 94 | 0 | 255 | 255 | 255 | 255 | 192 | 0 | 255 | ... |
| 95 | 0 | 255 | 255 | 255 | 255 | 224 | 0 | 255 | ... |
| AD96 → 96 | 0 | 255 | 255 | 255 | 255 | 255 | 0 | 255 | ... |
| ⋮ | ⋮ | ⋮ | ⋮ | ⋮ | ⋮ | ⋮ | ⋮ | ⋮ | |

FIG.11

SCREEN DOT GROWTH (EMBODIMENT 2)

FIG.12A INPUT PIXEL VALUE 64 AREA RATIO 25%

FIG.12B INPUT PIXEL VALUE 68 AREA RATIO 26.5625%

FIG.12C INPUT PIXEL VALUE 72 AREA RATIO 28.125%

FIG.12D INPUT PIXEL VALUE 76 AREA RATIO 29.6875%

FIG.12E INPUT PIXEL VALUE 80 AREA RATIO 31.25%

FIG.12F INPUT PIXEL VALUE 96 AREA RATIO 37.5%

FIG.13A LOW LINE NUMBER SCREEN CELL 60

FIG.13B AREA RATIO 25%

FIG.13C AREA RATIO 50%

FIG.13D HIGH LINE NUMBER SCREEN CELL 70

FIG.13E AREA RATIO 25%

FIG.13F AREA RATIO 50%

IMAGE PROCESSING APPARATUS AND IMAGE PROCESSING METHOD FOR BINARY AND MULTIVALUE HALFTONING

This is a Continuation of application Ser. No. 11/251,207 filed Oct. 17, 2005. The disclosure of the prior application is hereby incorporated by reference herein in its entirety.

BACKGROUND OF THE INVENTION

1. Field of the Invention

The present invention relates to an image processing apparatus which converts a multiple gradation image into a binary or multivalue image by use of an area gradation method according to a screen cell, and more particularly to an image processing apparatus, which performs halftone processing to realize fine expression with multiple gradation according to dot growth properties that screen cell dots increase or decrease with an increase in gradation degree, and an image processing method.

2. Description of the Related Art

For example, for halftone processing (halftoning) of a multiple gradation image of a laser printer, an area gradation method is extensively used to array prescribed screen cells to form a multiple gradation image and to largely grow dots in a prescribed order with an increase in gradation value.

Incidentally, in a device with poor reproducibility of isolated dots such as a laser printer, it is possible to improve reproducibility of a low gradation portion and to improve the definition of intermediate and high gradation portions by configuring a screen cell to have large dots with a small line number in the low gradation portion and a screen cell to have fine dots with a large line number in the intermediate and high gradation portions.

FIG. 13A through 13F are diagrams showing a screen cell used for conventional halftone processing and dot growth thereof.

FIG. 13A through 13C show that a screen cell 60 with a small line number [FIG. 13A] is used, individual dots in the screen cell 60 grow in a prescribed order with an increase in the gradation value of individual pixels of multiple gradation image data to be converted, and when a dot shape with a prescribed gradation value is determined [FIG. 13B], the pertinent dot shape is remained as it is when a gradation value is higher than it, and the dots further grow [FIG. 13C].

Similarly, FIG. 13D through 13F show that a screen cell 70 with a large line number [FIG. 13D] is used, and when a dot shape with a prescribed gradation value is determined [FIG. 13E] in a process of growing individual dots in the screen cell 70 according to a prescribed order with an increase in the gradation value of individual pixels, the dot shape is remained as it is when a gradation value is higher than it, and the dots further grow [FIG. 13F].

Thus, according to the conventional known halftone processing technology, the dots in the screen cell grow according to the prescribed order, and when a dot shape with a prescribed gradation value is determined, the dot shape is remained as it is when the gradation value is higher than it, and the dots grow furthermore.

According to the above method, the dot shape which has become large cannot be made smaller. Therefore, it is impossible to switch a screen line number according to a prescribed gradation value by using one screen cell in such a way that the low gradation portion is based on a small line number screen, and the intermediate and high gradation portions are based on a large line number screen.

Therefore, there are developed various technologies that a screen cell with plural line numbers is provided in advance and switched.

Japanese Patent Laid-Open Publication No. 2000-71439 describes a technology that in a multivalue printer having plural kinds of dots such as small dots and large dots, such as an inkjet printer, has a highlight portion interlocked with the small dots and made to come interlocking with the large dots as it becomes thick.

Japanese Patent Application Laid-Open No. 11-331562 discloses a technology that a screen is switched between a small line number and a large line number depending on the image properties (edge/non-edge).

Japanese Patent Application Laid-Open No. 11-331562, No. 7-254985, No. 7-254986, No. 7-283941, No. 8-114965, No. 8-125863 and No. 8-156329 disclose technologies that to improve reproducibility of a highlight portion, pulse width modulation is used for writing, and dither processing with 2 dots weighted in a main scanning direction is performed to stabilize the highlight portion by reproduction with a small line number.

Especially, Japanese Patent Application Laid-Open No. 8-156329 discloses a technology that it is judged whether a kind of image density signal is a line image or a natural image, and an optimum recording line number is selected depending on the kind.

According to the existing technologies described in Japanese Patent Application Laid-Open No. 2000-71439, No. 11-331562, No. 7-254985, No. 7-254986, No. 7-283941, No. 8-114965, No. 8-125863 and No. 8-156329 described above, plural types of screen cells are provided in advance, the screen cells are switched depending on the image properties (characters/photos, edges/non-edges and the like) or depending on low density or high density.

Therefore, it is necessary to provide previously the plural types of screen cells, and it is necessary to have a mechanism of switching the individual screen cells.

According to the above conventional method, the screen cell numbers to be switched are variable depending on the printer properties and an object, and there may be a problem that flexible compliance cannot be made by a prescribed number of screen cells.

An increase in the types of screen cell numbers subject to switching increases the storage capacity of the screen cell and makes the switching control complex, resulting in increasing the apparatus cost.

SUMMARY OF THE INVENTION

The present invention has been made in view of the above circumstances and provides an image processing apparatus, which does not require plural screen cells or a switching function thereof and can switch flexibly a screen structure, and an image processing method.

An aspect of the present invention provides an image processing apparatus for converting a multiple gradation image into a binary or multivalue image by use of an area gradation method according to a screen cell, which includes: a receiving unit that receives an input pixel value of each pixel of the multiple gradation image and position information on the screen cell; and an output unit that outputs an output pixel value, which is increased or decreased with an increase in the input pixel value, at a pixel position on the screen cell corresponding to the position information, according to the input pixel value and the position information received by the receiving unit.

BRIEF DESCRIPTION OF THE DRAWINGS

Embodiments of the present invention will be described in detail based on the following figures, wherein:

FIG. 8 is a table showing data contents of a lookup table used in a first embodiment;

FIG. 11 is a table showing data contents of a lookup table used in a second embodiment;

FIG. 12A through FIG. 12F are diagrams showing screen dot growth according to the second embodiment; and FIG. 13A through FIG. 13F are diagrams showing screen cells used for conventional halftone processing and dot growth thereof.

DETAILED DESCRIPTION OF THE INVENTION

Embodiments of the present invention will be described in detail with reference to the accompanying figures.

Figure 1:
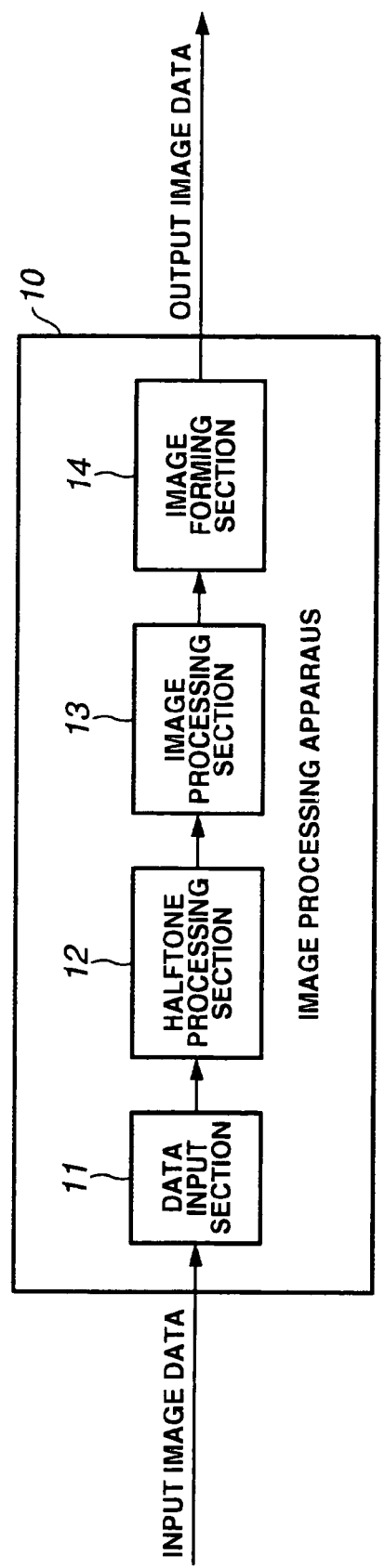
FIG. 1 is a block diagram showing a functional structure of an image processing apparatus according to the present invention.

FIG. 1 is a block diagram showing a functional structure of the image processing apparatus according to the present invention.

This image processing apparatus 10 is, for example, a laser printer and provided with a data input section 11, a halftone processing section 12, an image processing section 13 and an image forming section 14.

For example, the data input section 11 takes image data, which is instructed to be printed, from an unshown client PC and inputs to the halftone processing section 12.

The image processing apparatus of the present invention is assumed to be an 8-bit system, and the image data which is input to the halftone processing section 12 is intermediate gradation (multiple gradation) image data having a gradation value (pixel value) of, for example, any of 256 gradations having values of 0 to 255 for individual pixels.

The halftone processing section 12 performs halftone processing to convert image data (multiple gradation image data) which is input from the data input section 11 to, for example, a multivalue image by use of an area gradation method according to the screen cell.

Figure 2:
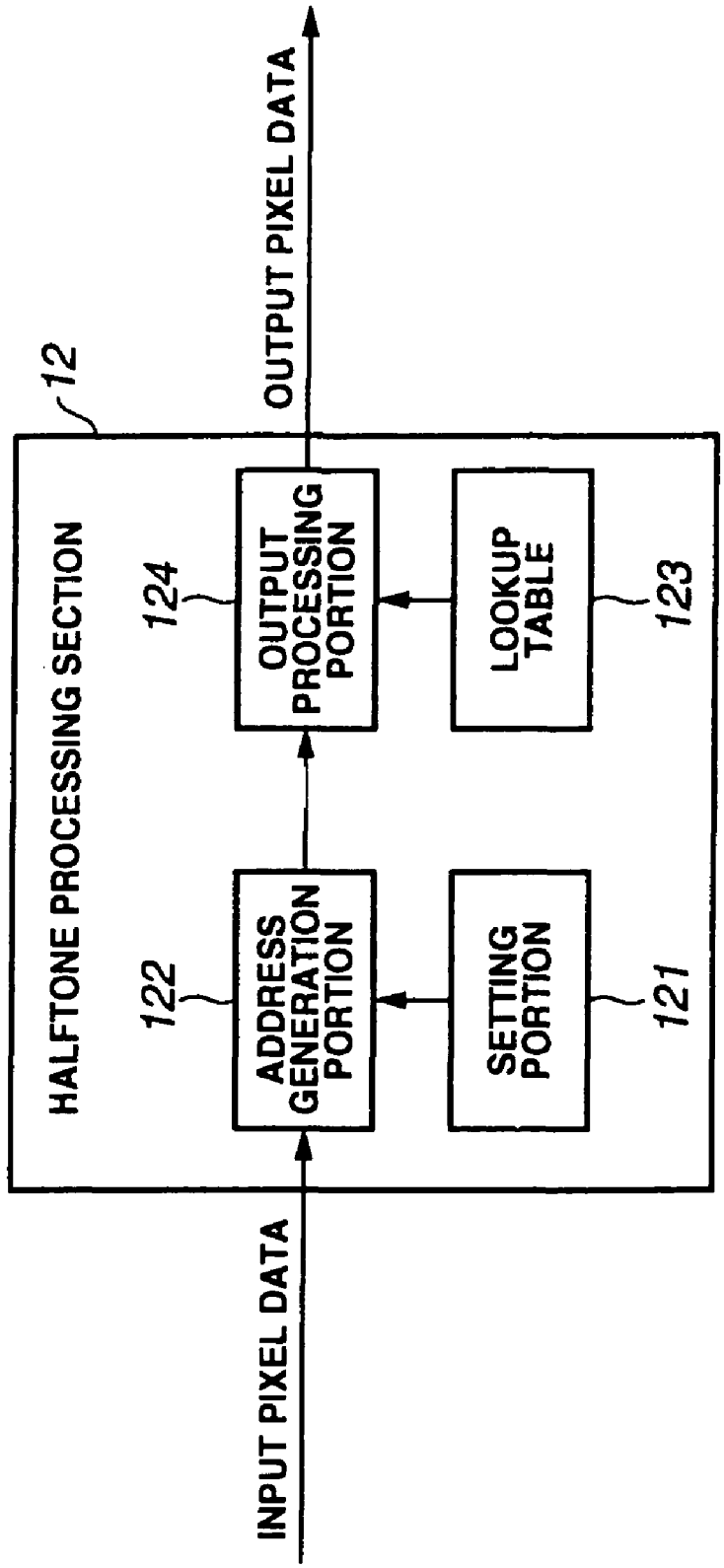
FIG. 2 is a block diagram showing a functional structure of the halftone processing section of FIG. 1.

FIG. 2 is a block diagram showing a functional structure of the halftone processing section 12 of the image processing apparatus 10 shown in FIG. 1.

As shown in FIG. 2, the halftone processing section 12 is provided with a setting portion 121 which sets a size of a screen cell having a size of n×n corresponding to a pixel position of input image (multiple gradation image) data and information about how to array the screen cell in input image data to be converted and processes to calculate the position of a current screen cell according to the set information; an address generation portion 122 which generates an address of a lookup table 123 according to the screen cell position calculated by the setting portion 121 and an input pixel value; the lookup table 123 in which an output pixel value is stored in correspondence with the input pixel value; and an output processing portion 124 which reads the output pixel value corresponding to the input pixel value from the lookup table 123 for each pixel according to the address generated (converted) by the address generation portion 122 and outputs to the image processing section 13.

Figure 3:
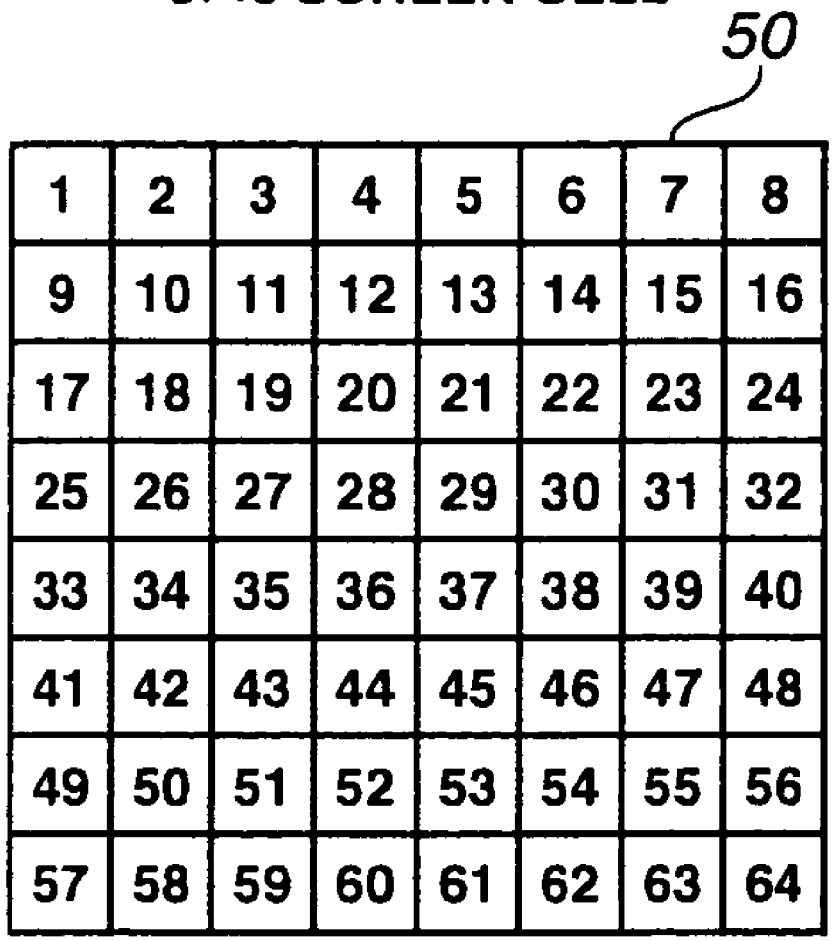
FIG. 3 is a diagram showing a structure of a screen cell used for halftone processing.

In the construction of the halftone processing section 12, the setting portion 121 sets a screen cell size of a screen cell 50 which is comprised of an 8×8 cell arrangement as shown in, for example, FIG. 3 and information about how the screen cell 50 is arrayed in input image data which is to be converted.

In FIG. 3, numerical values described in the 64 individual cells configuring the screen cell 50 are cell numbers corresponding to the individual cells.

Figure 4:
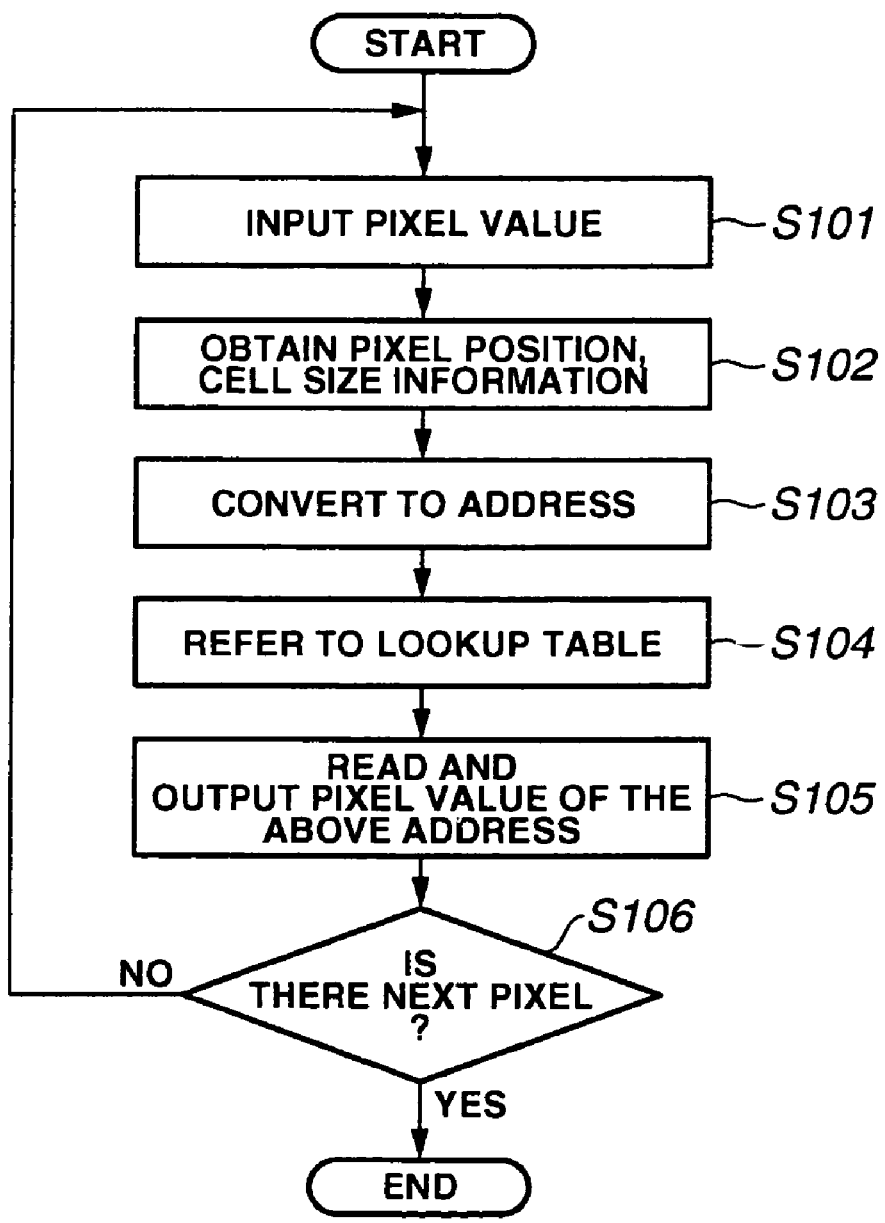
FIG. 4 is a flow chart showing halftone processing by a halftone processing section.

FIG. 4 is a flow chart showing halftone processing by the halftone processing section 12 of the image processing apparatus 10 according to the present invention.

When multiple gradation image data of document information to be printed is input from a client PC to the halftone processing section 12, the address generation portion 122 takes the pixel value of a first pixel of the input image data (step S101) and also obtains information about the pixel position of the pertinent pixel and the cell size of the screen cell 50 from the setting portion 121 (step S102), generates an address of the lookup table 123 according to the obtained information and the pixel value (input pixel value) of the pixel (step S103) and gives the address to the output processing portion 124.

The output processing portion 124 refers to the lookup table 123 according to the address which is generated (converted) by the address generation portion 122 (step S104), reads an output pixel value corresponding to the address from the lookup table 123 and outputs as the output pixel value to the image processing section 13 (step S105).

When the conversion of the first pixel of the input image data into the output pixel value is completed, the address generation portion 122 checks whether or not there is a next pixel (step S106). If there is a next pixel (YES in step S106), the address conversion processing is performed according to the pixel position of the pixel and the input pixel value through steps S101 to S103. The converted address is sent to the output processing portion 124, and an output pixel value corresponding to the address (input pixel value of the pixel) is read from the lookup table 123 and output to the image processing section 13 (steps S104 to S105).

The process from step S101 to step S105 is continued until it is judged that there is a next pixel (YES in step S106). If it is judged during the above process that there is not a next pixel (NO in step S106), it is judged that the processing of all the pixels is completed, and the series of halftone processing (conversion processing from the input multivalue image to an output multivalue image) is terminated.

Figure 5:
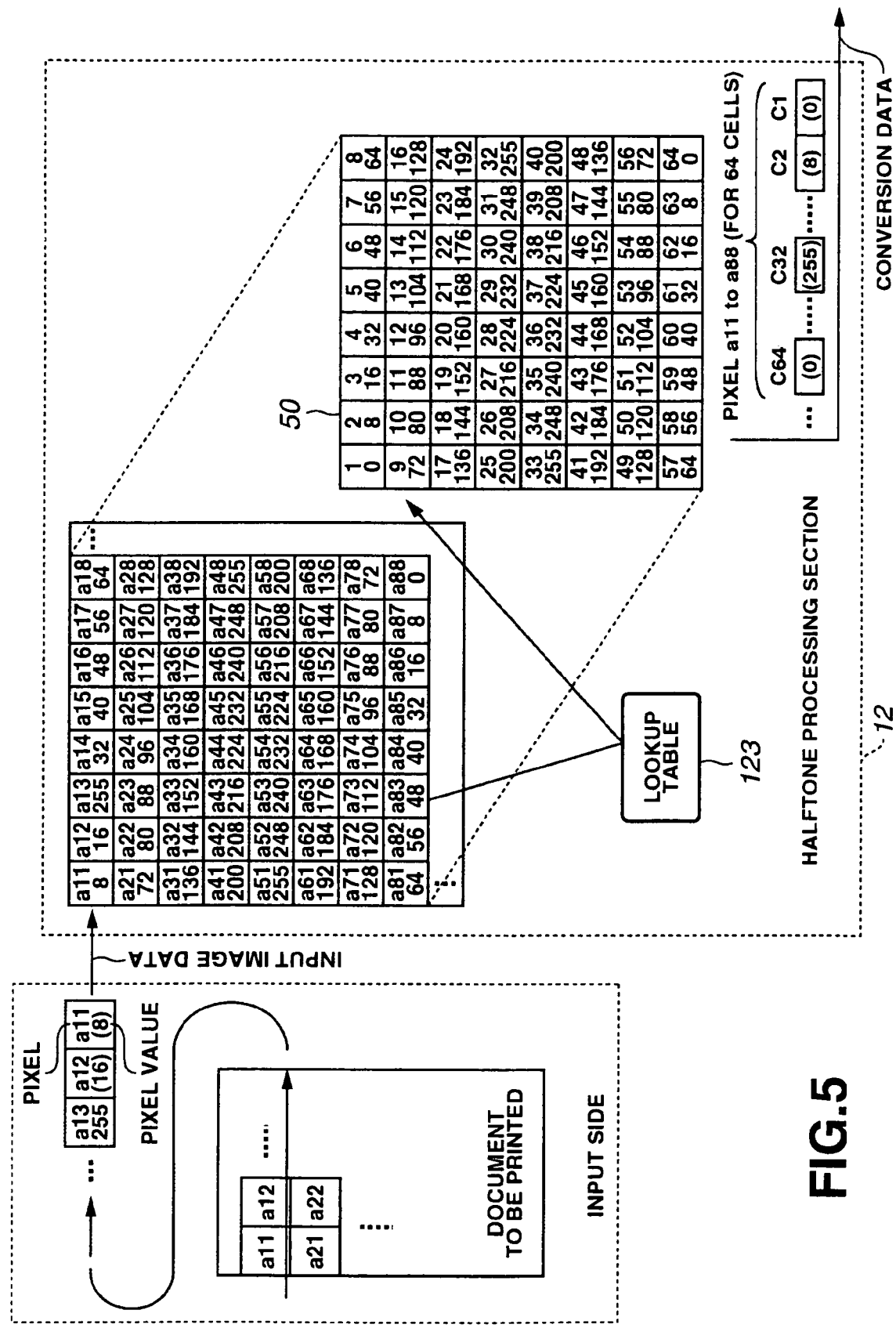
FIG. 5 is a conceptual view showing an operation of halftone processing by the halftone processing section.

FIG. 5 is a conceptual view showing an operation of halftone processing by the halftone processing section 12.

In FIG. 5, the halftone processing section 12 receives input of image data (aggregation of pixels having gradation values 0 to 255) of documents to be printed from the input side, for example, a client PC, takes a first pixel (a11) of the input image data, determines an address of the lookup table 123 corresponding to the pixel (a11) and reads a pertinent output pixel value from the lookup table 123 according to the address. Here, the screen cell 50 is arrayed in the region of all the pixels of the pertinent input image data to perform halftone processing, and output pixel values corresponding to the 64 pixels are read sequentially with the screen cell 50 arrayed in the first 64 pixels at that time.

Specifically, the output pixel values of the individual cell numbers of the screen cell 50 are stored in correspondence with the plural different input pixel values in the lookup table 123, and one output pixel value is read in correspondence with the input pixel value of one pixel a11 because a screen cell with an 8×8 cell arrangement (see FIG. 3) is used as the screen cell 50 in the present invention.

In FIG. 5, the numerical values in the individual cells of the screen cell 50 represent the cell number of the pertinent cell in the upper level and the output pixel value of the pertinent cell number in the lower level.

But, in the example shown in FIG. 5, the output pixel values of the individual cells in the screen cell 50 do not correspond to the input pixel values at that time.

It is exemplified that as the value of an output pixel value corresponding to the input pixel value of one pixel, there might be output pixel values for 32 gradations having 0 to 255 at 8 intervals. In practice, for example, at the time of processing the input pixel a11, the output pixel value corresponding to the pertinent input pixel value (8 in this example) is arranged in the corresponding cell in the screen cell 50.

Subsequently, in the halftone processing section 12, processing is continued such that the individual pixels are sequentially taken up to the final pixel of the input image data as described above, the output pixel values corresponding to the input pixel values of the pixels are determined from the lookup table 123, and they are sequentially sent to the image processing section 13.

Figure 6:
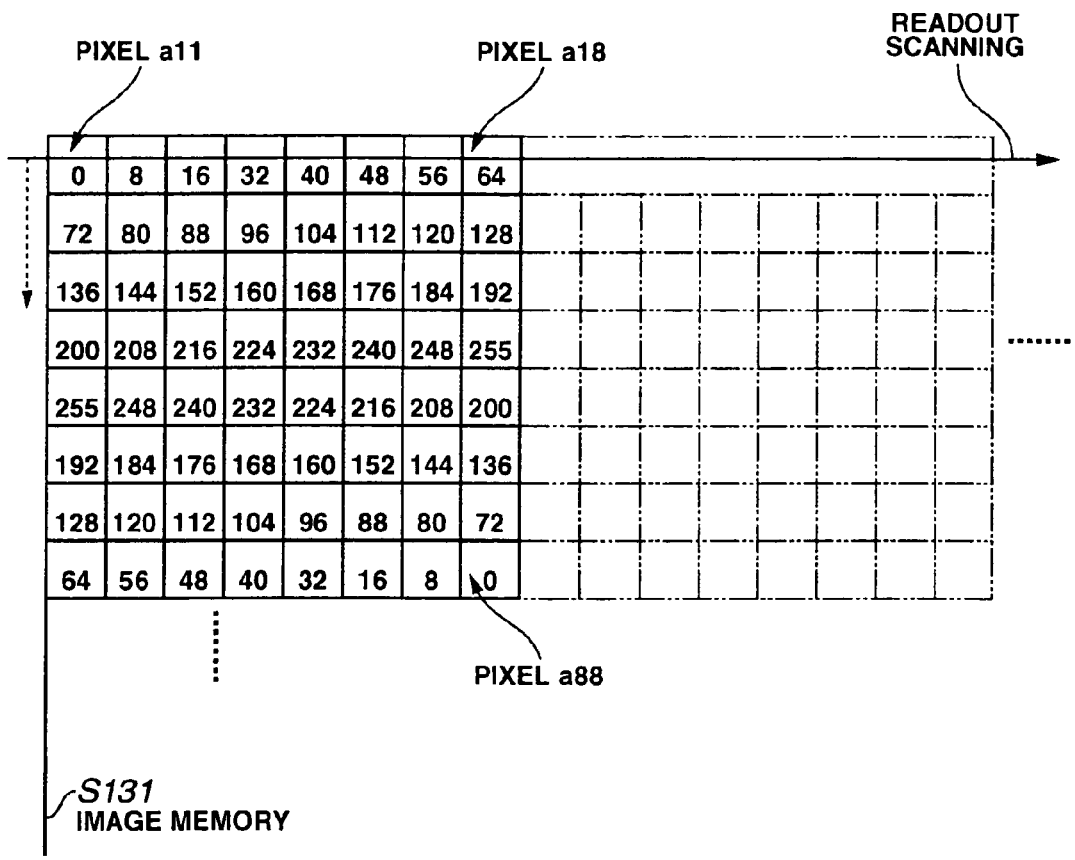
FIG. 6 is a conceptual view showing a state of expanding conversion data after the halftone processing.

In response to the above processing, the image processing section 13 sequentially takes in the output pixel values (0, 8, 16, . . . , 255) of the individual pixels which are output from the halftone processing section 12, combines the output pixel values of the individual pixels in the cell arrangement (8×8) of the screen cell 50 as shown in, for example, FIG. 6 and expands in regions corresponding to the individual pixels in an image memory 131.

Thus, after the halftone processing section 12 completes reading of the output pixel values of all the pixels of the input image data, the output pixel values of the individual pixels of all the pixels are expanded in a cell arrangement (8×8) of the screen cell 50 on the image memory 131. As a result, the halftone processing to array the screen cell 50 for each pixel in all regions of the input image data and to convert the individual pixels to the multiple gradation image is completed.

When the expansion of the output pixel values (conversion to output image data) corresponding to all the pixels of the input image data by the halftone processing is completed, the image processing section 13 reads and scans the output pixel values expanded in the image memory 131 line by line as indicated by the arrow shown in, for example, FIG. 6, and transfers sequentially to the image forming section 14.

In the image forming section 14, according to the output pixel values (0, 8, 16, . . . , 255) transferred from the image processing section 13, an intermediate gradation image corresponding to the input image data is printed out on a recording medium through a series of electrophotographic process in that exposing and scanning are performed on each line up to the final line while adjusting laser intensity (pulse width) of a laser exposure device to form an electrostatic latent image for one page on a photoconductor, the electrostatic latent image is developed (toner imaging), and the toner image is transferred to a recording medium, and heating for fixation is performed.

Through the above-described series of processing, the pixel value (output pixel value) of the image data converted by halftone processing performed by the halftone processing section 12 on the input image data is replaced with a laser pulse width in one pixel of the laser exposure device when the image processing apparatus 10 of the present invention is a laser printer.

Here, the output pixel value, which is input from the image processing section 13 to the image forming section 14, is obtained by converting in the halftone processing section 12 an input pixel value having any of values 0 to 255 to any of values of 32 gradations of 0, 8, 16, . . . , 255 (from 8 to 248 at 8 intervals: 255 comes next to 248) for each pixel by use of the screen cell 50 (see FIG. 5).

Thus, the image forming section 14 receives the above-described output pixel values (0, 8, 16, . . . , 255) transferred from the image processing section 13 and outputs a laser beam having a pulse width corresponding to the pertinent individual output pixel values from the laser exposure device to perform exposure and scanning according to the laser pulse output timing charts shown in, for example, FIG. 7A through FIG. 7D.

Figure 7:
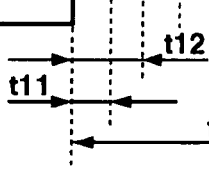
FIG. 7A through FIG. 7D are timing charts showing a laser pulse output mode of a laser exposure device.

As apparent from FIG. 7A through FIG. 7D, when the output pixel value is zero (0) [FIG. 7A], the laser beam is not output (laser extinguished), and when the output pixel value is 255 [FIG. 7D], the laser beam with a maximum pulse width (=t1) is output (laser fully lighted). And, for the output pixel values (8, 16, . . . , 248) during the above process, a laser beam is output with pulse widths (t11, t12, . . . ) according to the individual pixel values to perform exposure and scanning as exemplified in FIG. 7B and FIG. 7C.

By the above exposure and scanning, the output pulse width of the laser beam is reflected to the printing density of the pixel, and the printing density becomes dark as the pulse width becomes longer.

Thus, the converted image data expanded in the image memory 131 shown in FIG. 6 has its individual pixels printed as dot patterns (see FIG. 10A through FIG. 10D and FIG. 12A through FIG. 12F) which are filled in at a density (white when output pixel value=0, total block when output pixel value=255, and high density as a numerical value is larger between the values 0 and 255) corresponding to the output pixel value. As a result, the input multivalue image can be reproduced as a multivalue image by use of the area gradation method according to the screen cell 50.

As described above, the image processing apparatus 10 of the present invention has a halftone processing function which converts input multivalue image data having pixel values (gradations) 0 to 255 to multivalue image data of an 8×8 arrangement expressed in 32 gradations for each pixel by the halftone processing section 12 by use of the area gradation method according to the screen cell 50.

Especially, the halftone processing section 12 in the image processing apparatus 10 of the present invention has a feature provided with a halftone processing function to convert input image data into area gradation data by using one screen cell 50 with the number of dots to be filled in the screen cell 50 not following a simple increase based on arbitrary screen line numbers with respect to an increase in the gradation of each pixel of the input image data but following the dot growth properties to increase or decrease with respect to the increase in the gradation of each pixel of the input image data.

The halftone processing function according to the present invention will be described in detail with reference to individual embodiments.

Embodiment 1

The image processing apparatus 10 according to the first embodiment is provided with the halftone processing section 12 which is comprised of the functional structure shown in the block diagram of FIG. 2.

In the structure of the halftone processing section 12 shown in FIG. 2, the setting portion 121 sets a pixel position, a cell size and the like related to the operation of the screen cell 50 which is comprised of the 8×8 cell (having cell numbers 1 to 64) arrangement shown in FIG. 3.

In this embodiment, for the lookup table 123 in the construction shown in FIG. 2, for example, a lookup table 123a which stores the data contents shown in FIG. 8 is used on the assumption that the above-described screen cell 50 is used.

In the lookup table 123a, the output pixel value of each of cell numbers 1 to 64 (FIG. 8 shows only cell numbers 1, 2, 10, 16 and 36 but all of cell numbers 1 to 64 are stored) in the screen cell 50 is stored in correspondence with each of the input pixel values (input values).

FIG. 8 shows input pixel values of only 0 to 129, but in practice, values 129 through 255 are stored.

Meanwhile, the address generation portion 122 holds an input value/address conversion table showing a correspondence relationship between the individual input pixel values and the storage addresses of the individual input pixel values in the lookup table 123a.

Thus, the address generation portion 122 extracts sequentially the input pixel values of the individual pixels from the input image data, determines the addresses corresponding to the extracted input pixel values from the above-described input value/address conversion table, converts the input pixel values into the corresponding addresses and notifies to the output processing portion 124.

In the output processing portion 124, the addresses converted by the address generation portion 122 are used as a key to retrieve the lookup table 123a, and the output pixel values of the individual cells with cell numbers 1 to 64 corresponding to the input pixel values stored in the addresses are read and output.

Here, as to the data contents of the lookup table 123a shown in FIG. 8, a change in the output pixel value of each of the individual cell numbers corresponding to the change in the input pixel value is observed.

As to, for example, the cell with cell number 1 in the lookup table 123a, when the input pixel value is 0 to 7, the output pixel value increases sequentially from 0 to 244 at 32 intervals, and when the input pixel value is between 8 and 129, the output pixel value is kept at 255.

As to the cell with cell number 2, when the input pixel value is between 0 and 56, the output pixel value is 0, when the input pixel value is between 57 and 64, the output pixel value increases from 32 to 255, and when the input pixel value is 65 or more, the output pixel value returns to zero (=0). After that, the output pixel value is kept at zero.

As to the cell with cell number 10, when the input pixel value is between 0 and 64, the output pixel value is 0, when the input pixel value is between 65 and 95, the output pixel value increases from 8 to 248 at 8 intervals, and when the input pixel value is 96 or more, the output pixel value is kept at 255.

As to the cell with cell number 16, when the input pixel value is between 0 and 48, the output pixel value is 0, when the input pixel value is between 49 and 55, the output pixel value increases from 32 to 224 at 32 intervals, and when the input pixel value is between 56 and 64, the output pixel value is kept at 255. After that, when the input pixel value becomes 65 or more, the output pixel value returns to 0, and then, the output pixel value is kept at 0 until the input pixel value becomes 129.

As to the cell with cell number 36, when the input pixel value is between 0 and 24, the output pixel value is 0, when the input pixel value is between 25 and 31, the output pixel value increases from 32 to 224 at 32 intervals, when the input pixel value is between 32 and 64, the output pixel value is kept at 255, and when the input pixel value is 65, the output pixel value returns to 0. After that, the output pixel value is kept at 0 until the input pixel value becomes 96, and when the input pixel value is between 97 and 127, the output pixel value increases from 8 to 248 at 8 intervals, and when the input pixel value is 128 and 129, the output pixel value becomes 255.

Figure 9:
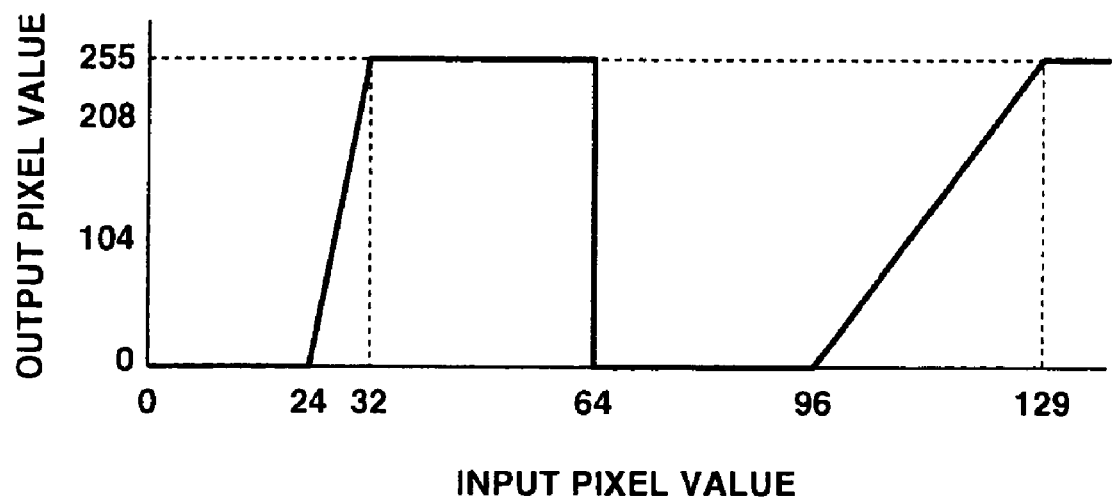
FIG. 9 is a diagram showing a table data change curve of a cell with cell number 36 of the first embodiment.

FIG. 9 is a diagram showing a table data change curve of the cell with cell number 36. As apparent from FIG. 9, the output pixel value of the cell with the cell number 36 monotonically increases (input pixel value=24 to 32) from zero (=0) with an increase in the input pixel value, then returns to zero (when input pixel value=64) and changes again to monotonically increase (input pixel value=96 to 129).

As exemplified above about the changes in the output pixel values of several cells corresponding to the changes in the input pixel values, the lookup table 123a of the image processing apparatus 10 according to the first embodiment includes an address of a data region, in which the output pixel values corresponding to the input pixel values are stored, to increase and decrease the corresponding output pixel value with the increase in the input pixel value.

Especially, the output pixel value corresponding to the input pixel value is stored in correspondence with the address to monotonically increase from zero (=0) with the increase in the input pixel value, then to return to zero and then to monotonically increase again like the cell with the cell number 36 or the like.

Then, the screen cell dot growth according to the halftone processing by the halftone processing section 12 by use of the lookup table 123a having the above data structure will be described with reference to FIG. 10A through FIG. 10D.

In FIG. 10A through FIG. 10D, FIG. 10A shows the dot pattern of the screen cell 50 when the input pixel value is 52 [at this time, an area ratio of lighted cells (cells with output pixel values other than zero) with respect to the entire cell region in the screen cell 50 is 20.3125%].

Figure 10:
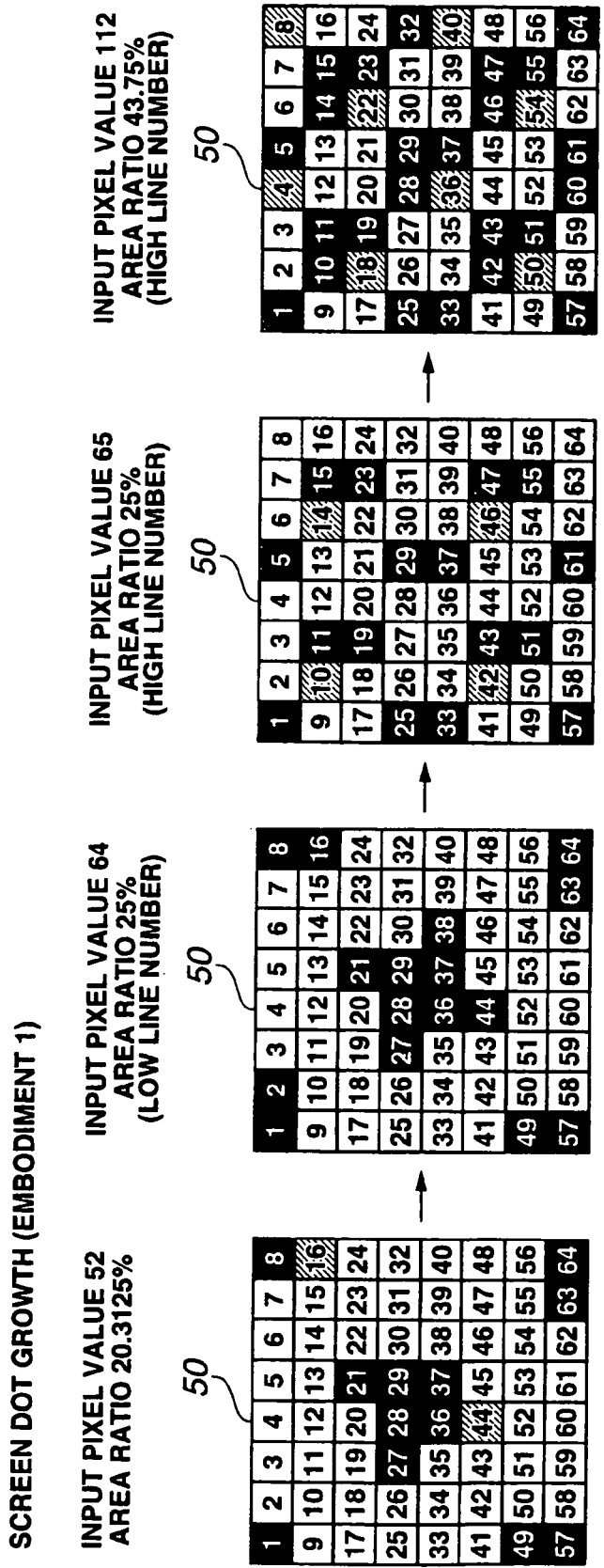
FIG. 10A through FIG. 10D are diagrams showing screen dot growth according to the first embodiment.

Similarly, FIG. 10B shows the dot pattern of the screen cell 50 when the input pixel value is 64 (area ratio=25%), FIG. 10C shows the dot pattern of the screen cell 50 when the input pixel value is 65 (area ratio=25%), and FIG. 10D shows the dot pattern of the screen cell 50 when the input pixel value is 112 (area ratio=43.75%).

In FIG. 10A through FIG. 10D, when the input pixel value is 52, the output pixel values read from the lookup table 123a (see AD52 of FIG. 8) are 255 for the individual cells with cell numbers 1 and 36, 0 for the individual cells with cell numbers 2 and 10, 128 for the cell with cell number 16, .... As a result, where the output pixel values read for all the cells are arranged in the related cell regions of the screen cell 50 (in practice, corresponding to a case that printing is effected by laser output with a pulse width corresponding to the pertinent input pixel value according to the pertinent arrangement), the dot pattern becomes as shown in FIG. 10A.

In FIG. 10A, for example, the individual cells with cell numbers 1 and 36 are lit (fully lighted) in correspondence with the read output pixel value=255, and the individual cells with cell numbers 2 and 10 are in a non-lighted state in correspondence with the read output pixel value=0. And, the cell with cell number 16 is lit with a pulse width [pulse width shorter than when fully lighted: corresponding to the output pixel value] in correspondence with the read output pixel value=128.

Similarly, cells with numbers 8, 16, ..., 248 read as output pixel values fall in a lit state with a pulse width corresponding to the pertinent output pixel values.

In FIG. 10A through FIG. 10D, when the input pixel is 64, the output pixel values read from the lookup table 123a (see AD64 of FIG. 8) are 255 for the individual cells with cell numbers 1, 2, 16 and 36, 0 for the cell with cell number 10, . . . . As a result, the screen cell 50 has a dot pattern as shown in FIG. 10B.

In FIG. 10B, for example, the individual cells with cell numbers 1, 2, 16 and 36 are lit (fully lighted) in correspondence with the read output pixel value 255, and the cell with the cell number 10 is extinguished in correspondence with the read output pixel value=0.

In FIG. 10A through FIG. 10D, when the input pixel value is 65, output pixel values 255, 0, 8, 0, 0, . . . are read for the individual cells with cell numbers 1, 2, 10, 16, 36, . . . from the lookup table 123a (see AD65 of FIG. 8). As a result, the screen cell 50 has a dot pattern as shown in FIG. 10C.

In FIG. 10C, for example, the cell with cell number 1 is lit (fully lighted) in correspondence with the read output pixel value 255, the individual cells with cell numbers 2, 16 and 36 are extinguished in correspondence with the read output pixel value=0, and the cell with cell number 10 is lit with a pulse width in correspondence with the read output pixel value=8.

In FIG. 10A through FIG. 10D, when the input pixel value is 112, output pixel values 255, 0, 255, 0, 128, . . . are read for the individual cells with cell numbers 1, 2, 10, 16, 36, . . . from the lookup table 123a (see AD112 of FIG. 8). As a result, the screen cell 50 has a dot pattern as shown in FIG. 10D.

In FIG. 10D, for example, the individual cells with cell numbers 1 and 10 are lit (fully lighted) in correspondence with the read output pixel value 255, the cells with cell numbers 2 and 16 are extinguished in correspondence with the read output pixel value=0, and the cells with the cell number 36 is lit with a pulse width in correspondence with the read output pixel value=128.

Here, the growth of the screen cell dot by use of the lookup table 123a having the data structure shown in FIG. 8 is verified through the comparison of the individual screen dot patterns of FIG. 10A through FIG. 10D.

In FIG. 10A through FIG. 10D, when attention is focused on the cell with cell number 2 having an output pixel value increased at the time of a change from input pixel value=52 [FIG. 10A] to input pixel value=64 [FIG. 10B], the cell is extinguished (output value=0) when changed from input pixel value=64 [FIG. 10B] to input pixel value=65 [FIG. 10C].

At this time (when changed from input pixel value 64 to 65), the individual cells (dots) with cell numbers 8, 16, 21, 27, 28, 36, 38, 44, 49 and 63, which were in a lit state when input pixel value=64, are extinguished in the same manner as the cell with the cell number 2 [see FIG. 10C].

Instead, for the individual cells with cell numbers 5, 11, 15, 19, 23, 25, 33, 43, 47, 51, 55 and 61, the cells, which were extinguished (output value=0) when input pixel value=64 [see FIG. 10B], are lit (output value=255) when input pixel value=65 [see FIG. 10C].

Thus, when the input pixel value is changed from 64 to 65, the shape of the screen cell 50 is switched from a state of small line number (line number=5) in FIG. 10B to a state of large line number (line number=10) in FIG. 10C.

Then, at the time of changing from input pixel value=65 [FIG. 10C] to input pixel value=112 [FIG. 10D], the output values of the individual cells with cell numbers 4, 8, 10, 14, 18, 22, 28, 32, 36, 40, 42, 46, 50, 54, 60 and 64 are sequentially increased with the increase of the input pixel value on the basis of the dot growth of the large line number screen so to have the dot pattern as shown in FIG. 10D.

Thus, an operation capable of switching the screen shape from a small line number to a large line number with the input pixel value 64 as the borderline can be realized by adopting the lookup table 123a as shown in FIG. 8 in which an output pixel value corresponding to the input pixel value is stored so that screen cell numbers having a characteristic, that a corresponding output pixel value increases and decreases with the increase in the input pixel value, are intermingled, e.g. the output pixel value monotonically increases from zero with the increase in the input pixel value, returns to zero when the input pixel value exceeds 64 and monotonically increases again with the increase in the input pixel value.

According to the construction of the embodiment described above, the screen structure can be switched from a small line number to a large line number by use of one screen cell 50 by controlling lighting and extinguishing of the individual cells of the screen cell 50, and an image having a different screen line number between a low gradation portion and a high gradation portion can be formed by use of a single lookup table.

Specifically, a low gradation area (area with input pixel values 0 to 64 in this embodiment) with a prescribed input pixel value or below provides stable reproduction by a small line number screen. As a result, gradation becomes good, and intermediate and high gradation areas (area with an input pixel value 65 or more) can improve the definition of a reproduced image by use of a large line number screen.

In the above-described embodiment, switching between two kinds of screen line numbers is exemplified, but switching among three kinds or more of screen line numbers can be made by the same manner.

According to the above description, it is exemplified that an input multiple gradation image is converted to a multivalue image by use of an area gradation method according to the screen cell, but it is also possible to convert to a binary image.

In such a case, for the output pixel values 0 to 255 which are set in correspondence with the individual screen cell numbers in the lookup table 123a shown in, for example, FIG. 8, a replace/read processing function which performs reading and outputting with 0 to less than 129 replaced by "0" and 129 or more replaced by "1" may be added.

When one screen cell is used to switch the screen line number in this embodiment, it is set to switch the screen [FIG. 10B] of line number 5 to the screen [FIG. 10C] of line number 10 with a prescribed input pixel value as the borderline as shown in, for example, FIG. 10A through FIG. 10D. In addition, it is also possible to operate so that the screen line number increases continuously with the increase in the input pixel value as indicated by line number 5→line number 6→line number 7 . . . , in conformity with, for example, a low gradation area, an intermediate gradation area, a high gradation area and the like.

In the above case, a lookup table in which output pixel values corresponding to input pixel values are stored may be adopted instead of the lookup table 123a used in the first embodiment, so that the screen line number increases continuously with the increase in the input pixel value on the assumption that the output pixel value corresponding to the input pixel value is stored (data setting here is the same as in the lookup table 123a) so as to increase or decrease the corresponding output pixel value with the increase in the input pixel value.

Embodiment 2

The image processing apparatus 10 according to the second embodiment is provided with the halftone processing section 12 which is comprised of the functional structure shown in the block diagram of FIG. 2. In the structure, the setting portion 121 keeps the screen line number at a prescribed level with the increase of the input pixel value as described in detail later with respect to the screen cell 50 (see FIG. 3: the cell structure is the same as in the first embodiment) but performs setting of a pixel position, a cell size and the like applied to an operation such that an image with different dot positions can be formed.

In this embodiment, for the lookup table 123 in the construction shown in FIG. 2, the lookup table 123b, in which the data contents shown in, for example, FIG. 11 are stored, is adopted.

In the lookup table 123b, the output pixel values for the cell numbers 1 to 64 (only cell numbers 2, 7, 14, 15, 22, 23, 27 and 30 are shown in FIG. 11, but all cell numbers 1 through 64 are stored in practice) of the screen cell 50 are stored in correspondence with the individual input pixel values (input values).

As to the input pixel values, only 64 through 96 are shown in FIG. 12A through FIG. 12F, but values 0 through 255 are stored in practice.

Meanwhile, the address generation portion 122 holds an input value/address conversion table which shows a corresponding relationship of the individual input pixel values and the storage addresses of the individual input pixel values in the lookup table 123b, extracts sequentially the input pixel values of the individual pixels from the input image data, determines the addresses corresponding to the extracted input pixel values from the input value/address conversion table, converts the pertinent input pixel values to corresponding addresses, and notifies to the output processing portion 124.

The output processing portion 124 retrieves the lookup table 123b using the addresses converted by the address generation portion 122 as a key, and reads and outputs the output pixel values of the individual cells with cell numbers 1 through 64 corresponding to the input pixel values (64 through 96) stored in the addresses.

Here, as to the data contents of the lookup table 123b in FIG. 11, a change in the output pixel value of each of the individual cell numbers with respect to the change in the input pixel value is observed.

In the lookup table 123b, for example, as to the cell with the cell number 2, the output pixel value is kept at 255 when the input pixel value is between 64 and 72, the output pixel value decreases sequentially from 224 to 0 at 32 intervals when the input pixel value is between 73 and 80, and then the output pixel value is kept at 0 when the input pixel value is between 81 and 96.

And, as to the cells with cell numbers 7 and 30, the output pixel value increases sequentially from 0 to 224 at 32 intervals when the input pixel value is between 64 and 71, and then the output pixel value is kept at 255 when the input pixel value is between 72 and 96.

As to the cell with the cell number 14, the output pixel value is 0 when the input pixel value is between 64 and 80, the output pixel value increases from 32 to 224 at 32 intervals when the input pixel value is between 81 and 87, and the output pixel value is kept at 255 when the input pixel value becomes 88 or more.

As to the cells with cell numbers 15 and 22, the output pixel value is 0 when the input pixel value is between 64 and 72, the output pixel value increases from 32 to 224 at 32 intervals when the input pixel value is between 73 and 79, and the output pixel value is kept at 255 when the input pixel value becomes 80 or more.

As to the cell with cell number 23, the output pixel value is 0 when the input pixel value is between 64 and 88, the output pixel value increases from 32 to 224 at 32 intervals when the input pixel value is between 89 and 95, and the output pixel value becomes 255 when the input pixel value is 96.

And, as to the cell with cell number 27, the output pixel value is 255 when the input pixel value is 64, the output pixel value decreases from 224 to 0 at 32 intervals when the input pixel value is between 65 and 72, and the output pixel value is kept at 0 when the input pixel value is 73 or more.

As exemplified above about the changes in the output pixel values of several cells corresponding to the changes in the input pixel values, the lookup table 123b of the image processing apparatus 10 according to the second embodiment includes the addresses of the data regions in which the output pixel values corresponding to the input pixel values are stored to increase and decrease the corresponding output pixel values with the increase in the input pixel values. Especially, the screen line number is kept at a prescribed level with the increase in the input pixel value, and the output pixel values corresponding to the input pixel values are stored in correspondence with the addresses so to form an image with a different dot position.

Then, the screen cell dot growth according to the halftone processing by the halftone processing section 12 by use of the lookup table 123b having the above data structure will be described with reference to FIG. 12A through FIG. 12F.

In FIG. 12A through FIG. 12F, FIG. 12A shows the dot pattern of the screen cell 50 when the input pixel value is 64 [at this time, an area ratio of lighted cells (cells with output pixel values other than zero) with respect to all the cell regions in the screen cell 50 is 25%].

Similarly, FIG. 12B shows the dot pattern of the screen cell 50 when the input pixel value is 68 (area ratio=26.5625%), FIG. 12C shows the dot pattern of the screen cell 50 when the input pixel value is 72 (area ratio=28.125%), FIG. 12D shows the dot pattern of the screen cell 50 when the input pixel value is 76 (area ratio=29.6875%), FIG. 12E shows the dot pattern of the screen cell 50 when the input pixel value is 80 (area ratio=31.25%), and FIG. 12F shows the dot pattern of the screen cell 50 when the input pixel value is 96 (area ratio=37.5%).

In FIG. 12A through 12F, when the input pixel value is 64, an output pixel value 255 is read from the lookup table 123b (see AD64 of FIG. 11) for the individual cells with cell numbers 2 and 27, and output pixel value 0, . . . are read for the individual cells with cell numbers 7, 14, 15, 22, 23 and 30. As a result, the screen dot pattern becomes as shown in FIG. 12A when the output pixel values read for all the cells are disposed at the pertinent cell positions of the screen cell 50.

And, when the input pixel value is 68, the output pixel value read from the lookup table 123b (see AD68 of FIG. 11) is 255 for the cell with the cell number 2, 128 for the cells with cell numbers 7, 27 and 30, and 0, . . . for the individual cells with cell numbers 14, 15, 22 and 23. As a result, the screen dot pattern becomes as shown in FIG. 12B when the output pixel values read for all the cells are disposed at the pertinent cell positions.

When the input pixel value is 72, the output pixel value read from the lookup table 123b (see AD72 of FIG. 11) is 255 for the individual cells with cell numbers 2, 7 and 30, and 0, . . . for the individual cells with cell numbers 14, 15, 22, 23 and 27. As a result, the screen dot pattern becomes as shown in FIG. 12C when the output pixel values read for all the cells are disposed at the pertinent cell positions.

When the input pixel value is 76, the output pixel value read from the lookup table 123b (see AD76 of FIG. 11) is 128 for the individual cells with cell numbers 2, 25 and 22, 255 for the individual cells with cell numbers 7 and 30, and 0, . . . for the individual cells with cell numbers 14, 23 and 27. As a result, the screen dot pattern becomes as shown in FIG. 12D when the output pixel values read for all the cells are disposed at the pertinent cell positions.

When the input pixel value is 80, the output pixel value read from the lookup table 123b (see AD80 of FIG. 11) is 0 for the individual cells with cell number 2, 14, 23 and 27, and 255, . . . for the individual cells with cell numbers 7, 15, 22 and 30. As a result, the screen dot pattern becomes as shown in FIG. 12E when the output pixel values read for all the cells are disposed at the pertinent cell positions.

In addition, when the input pixel value is 96, the output pixel value read from the lookup table 123B (see AD96 of FIG. 11) is 0 for the individual cells with cell numbers 2 and 27, and 255, . . . for the individual cells with cell numbers 7, 14, 15, 22, 23 and 30. As a result, the screen dot pattern becomes as shown in FIG. 12F when the output pixel values read for all the cells are disposed at the pertinent cell positions.

Here, the growth of the screen cell dot by use of the lookup table 123b having the data structure shown in FIG. 11 is verified through the comparison of the individual screen dot patterns of FIG. 12A through FIG. 12F.

First, a growth process of screen dots when the input pixel value 64 changes to the input pixel value 72 will be described with reference to cell numbers 7, 27 and 30.

When the input pixel value=64 [FIG. 12A], the cell with cell number 27 is in a fully lighted state, and the individual cells with cell numbers 7 and 30 are in a non-lighted state.

Then, with respect to the increase in the input pixel value, the dot of the cell with cell number 27 is gradually made small, while the dots of the individual cells with cell numbers 7 and 30 are gradually made large to change the screen shape from the dot type at the time when input pixel value=64 to a thin line type, while maintaining the same line number.

For example, the cell with cell number 27 has an output pixel value 255 when input pixel value=64 [FIG. 12A], then the output pixel value is decreased at 32 intervals in accordance with the increase in the input pixel value, and the output pixel value is made to 0 (lights out) when input pixel value=72 [FIG. 12C].

At the same time, for the cells with cell numbers 7 and 30, the output pixel value is increased at 32 intervals from input pixel value=64 [FIG. 12A] in accordance with the increase in the input pixel value, so that the output pixel value is made to have full lighting (255) when input pixel value=72 [FIG. 12C].

Thus, the individual cells with cell numbers 7, 27 and 30 when input pixel value=68 in FIG. 12B have a lighted state which is in the middle of changing from input pixel value=64 to input pixel value=72.

As described above, the screen pattern is changed while keeping a smooth increase in gradation at the time of changing from the input pixel value=64 to the input pixel value=72.

Similarly, when changing as indicated by input pixel value=72 [FIG. 12C]→input pixel value=76 [FIG. 12D]→input pixel value=80 [FIG. 12E] (increase in the input pixel value), the output pixel values of the individual cells with cell numbers 2 and 38 are decreased, and at the same time, the output values of the individual cells with cell numbers 15, 22, 43 and 50 are increased.

Besides, when changing as indicated by input pixel value=80 [FIG. 12E]→input pixel value=96 [FIG. 12F], the cells with cell numbers 14 and 51 are also increased to grow the dots in a line type pattern.

As described above, the dot pattern can be changed from the dot type pattern when input pixel value=64 [FIG. 12A] to the line type pattern when input pixel value=96 [FIG. 12F]. During the change, the line number of the screen cell 50 is kept to have the same screen line number without changing.

The dot pattern change described above can be realized by use of the lookup table 123b in which the data contents shown in FIG. 11 are stored.

In the embodiment described above, the output pixel value corresponding to the input pixel value is stored to increase and decrease the corresponding output pixel value with the increase in the input pixel value. Especially, the lookup table 123b, in which the output pixel values corresponding to the input pixel values are stored to form an image that the screen line number is kept at a prescribed level with the increase in the input pixel value but the dot positions are different, is used. Therefore, even when the screen has the same line number, the dot pattern shape can be changed freely in accordance with the gradation characteristics, and a screen optimum to the properties of a printer engine (image forming section 14) can be designed.

In this embodiment, it is not limited to the case that the input multiple gradation image is converted into the multivalue image by use of the area gradation method according to the screen cell, but it is also possible to convert into a binary image by adding the replace and read processing function for reading and outputting the output pixel values 0 to 255, which are set in accordance with the individual screen cell numbers by the lookup table 123b of, for example, FIG. 11, with 0 to less than 129 replaced by "0" and 129 or more replaced by "1" in the same manner as in the first embodiment.

Both the first and second embodiments described above are based on use of one screen cell 50, do not need another screen for each of a small line number and a large line number or a switching function of each screen and can realize the apparatus at a low cost.

By providing the setting portion 121, it is easy to flexibly conform to the properties of a printer by simply changing the screen cell structure.

According to the construction of the present invention, it is easy to displace the dot positions within the screen cell 50, so that moiré and the like can be avoided, and a change in the delicate pattern can be produced, so that a gradation jump due to dot gain can also be prevented.

In the first and second embodiments described above, the example of using the lookup table 123 to realize a dot growth process that the output pixel value is increased or decreased with the increase in the input pixel value is described, but the dot growth process can also be realized without using the lookup table 123. For example, measures may be taken to store only a change point and a rate of change in a register and to make interpolation calculations linearly during that storage.

As described above, a first aspect of the present invention provides an image processing apparatus for converting a multiple gradation image into a binary or multivalue image by use of an area gradation method according to a screen cell, which includes: a receiving unit that receives an input pixel value of each pixel of the multiple gradation image and position information on the screen cell; and an output unit that outputs an output pixel value, which is increased or decreased with an increase in the input pixel value, at a pixel position on the screen cell corresponding to the position information, according to the input pixel value and the position information received by the receiving unit.

A second aspect of the present invention provides the image processing apparatus according to the first aspect of the invention, wherein the output unit includes: a lookup table in which the output pixel value corresponding to the input pixel value is stored in such a manner that the corresponding output pixel value is increased or decreased with the increase in the input pixel value, and outputs the output pixel value by referring to the lookup table on the basis of the input pixel value and the position information received by the receiving unit.

A third aspect of the present invention provides the image processing apparatus according to the second aspect of the invention, wherein the lookup table stores the output pixel value corresponding to the input pixel value in such a manner that the output pixel value monotonically is increased from zero with the increase in the input pixel value, then returned to zero once and monotonically increased again.

A fourth aspect of the present invention provides the image processing apparatus according to the second aspect of the invention, wherein the lookup table stores the output pixel value corresponding to the input pixel value in such a manner that a screen line number is continuously changed with the increase in the input pixel value.

A fifth aspect of the present invention provides the image processing apparatus according to the second aspect of the invention, wherein the lookup table stores the output pixel value corresponding to the input pixel value in such a manner that an image is formed in which a screen line number is kept at a prescribed level with the increase in the input pixel value but a dot position is different.

A sixth aspect of the present invention provides an image processing method which converts a multiple gradation image into a binary or multivalue image by use of an area gradation method according to a screen cell, which includes: receiving an input pixel value of each pixel of the multiple gradation image and position information on the screen cell; and outputting an output pixel value which is increased or decreased with an increase in the input pixel value at a pixel position on the screen cell corresponding to the position information, according to the received input pixel value and the position information.

A seventh aspect of the present invention provides the image processing method according to the sixth aspect of the invention, wherein: the corresponding output pixel value which is increased and decreased with the increase in the input pixel value is previously stored at each of pixel positions of the screen cell on a lookup table in which an output pixel value corresponding to an input pixel value of each pixel of the multiple gradation image is stored; and an output pixel value is output based on the input pixel value and the position information by referring to the lookup table.

An eighth aspect of the present invention provides the image processing method according to the sixth aspect of the invention, wherein: the lookup table stores the output pixel value corresponding to the input pixel value in such a manner that the output pixel value is monotonically increased from zero with the increase in the input pixel value, then returned to zero once and monotonically increased again; and a single lookup table is used to form an image having a different screen line number between a low gradation portion and a high gradation portion.

A ninth aspect of the present invention provides the image processing method according to the sixth aspect of the invention, wherein: the lookup table stores the output pixel value corresponding to the input pixel value in such a manner that a screen line number is continuously changed with the increase in the input pixel value; and a single lookup table is used to form the image having a screen line number continuously changing with the increase in the input pixel value.

A tenth aspect of the present invention provides the image processing method according to the sixth aspect of the invention, wherein: the lookup table stores the output pixel value corresponding to the input pixel value in such a manner that an image is formed in which a screen line number is kept at a prescribed level with the increase in the input pixel value but a dot position is different; and a single lookup table is used to form the image having a screen line number kept at the prescribed level according to the increase in the input pixel value but a different dot position.

According to the present invention, the input pixel values of individual pixels of a multiple gradation image and the position information on the screen cells are accepted, and according to the accepted input pixel values and position information, the output pixel values which increase or decrease with the increase in the above-described input pixel values are output in correspondence with the pixel positions on the screen cells corresponding to the above-described position information. Therefore, the dot growth process capable of changing the screen structure and screen line number by use of one screen cell can be realized, stable reproducibility can be obtained in a low gradation area by a small line number screen, and improvement of definition in intermediate and high gradation areas can be expected.

Because one screen cell is used in the present invention, it is not necessary to provide a different screen for each of the small line number and the large line number or to provide a switching function of each screen, and the apparatus can be realized at a low cost.

Besides, it is also possible to flexibly conform to the properties of a printer by simply changing the screen cell structure according to settings.

The present invention can be applied to an image processing apparatus that a multiple gradation image is converted to a binary or multivalue image by use of an area gradation method according to a screen cell and can use a lookup table in which output pixel values corresponding to input pixel values are stored so to increase or decrease a corresponding output pixel value with an increase in the input pixel value to switch a screen structure flexibly without requiring plural screen cells and a switching function thereof.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-93910 filed on Mar. 29, 2005 including specification, claims, drawings and abstract is incorporated herein by reference in its entirety.

What is claimed is:

1. An image processing apparatus for converting a multiple gradation image into a binary or multivalue image by use of an area gradation method according to a screen cell, comprising:
 a receiving unit that receives an input pixel value of each pixel of the multiple gradation image and corresponding position information on the screen cell; and
 an output unit that has a lookup table storing a plurality of output pixel values corresponding to a plurality of input pixel values in such a manner that an image is formed in which an output pixel value is increased or decreased with an increase in the corresponding input pixel value, and a screen line number is kept at a prescribed level with the increase in the corresponding input pixel value but a dot position is different, and that outputs the output pixel value at a pixel position on the screen cell corresponding to the position information by referring to the lookup table, according to the corresponding input pixel value and the corresponding input pixel position information received by the receiving unit, wherein
 when the plurality of input pixel values are mid-range gradation values, the plurality of output pixel values increases monotonically across a range of grayscale image values from zero to a maximum value, maintains the maximum value for a first predetermined number of input pixel values, decreases monotonically across the range of grayscale image values from the maximum value to zero, maintains zero for a second predetermined number of input pixel values, and again increases monotonically across the range of grayscale image values from zero to the the maximum value, and
 the first predetermined number of input pixel values is at least one and the second predetermined number of pixel values is at least one.

2. The image processing apparatus according to claim 1, wherein the first predetermined number of input pixel values is at least nine.

3. The image processing apparatus according to claim 1, wherein the second predetermined number of input pixel values is at least nine.

4. The image processing apparatus according to claim 1, wherein the first predetermined number of input pixel values and the second predetermined number of pixel values is at least nine.

5. An image processing method which converts a multiple gradation image into a binary or multivalue image by use of an area gradation method according to a screen cell, comprising:
 receiving an input pixel value of each pixel of the multiple gradation image and position information on the screen cell;
 storing, in a lookup table, a plurality of output pixel values corresponding to a plurality of input pixel values in such a manner that an image is formed in which an output pixel value is increased or decreased with an increase in the input pixel value, and a screen line number is kept at a prescribed level with the increase in the input pixel value but a dot position is different; and
 outputting the output pixel value at a pixel position on the screen cell corresponding to the position information by referring to the lookup table, according to the received input pixel value and the position information, wherein
 when the plurality of input pixel values are mid-range gradation values, the plurality of output pixel values increases monotonically across a range of grayscale image values from zero to a maximum value, maintains the maximum value for a first predetermined number of input pixel values, decreases monotonically across the range of grayscale image values from the maximum value to zero, maintains zero for a second predetermined number of input pixel values, and again increases monotonically across the range of grayscale image values from zero to the the maximum value, and
 the first predetermined number of input pixel values is at least one and the second predetermined number of pixel values is at least one.

6. The image processing apparatus according to claim 5, wherein the first predetermined number of input pixel values is at least nine.

7. The image processing apparatus according to claim 5, wherein the second predetermined number of input pixel values is at least nine.

8. The image processing apparatus according to claim 5, wherein the first predetermined number of input pixel values and the second predetermined number of pixel values is at least nine.

* * * * *